(12) United States Patent
Won (10) Patent No.: US 10,430,213 B2
(45) Date of Patent: Oct. 1, 2019

(54) METHOD AND APPARATUS FOR PROVIDING HELP INFORMATION AND USER DEVICE ADAPTED TO THE METHOD

(71) Applicant: Samsung Electronics Co., Ltd., Gyeonggi-do (KR)

(72) Inventor: Sungjoon Won, Gyeonggi-do (KR)

(73) Assignee: Samsung Electronis Co., Ltd (KR)

( * ) Notice: Subject to any disclaimer, the term of this patent is extended or adjusted under 35 U.S.C. 154(b) by 857 days.

(21) Appl. No.: 14/597,792

(22) Filed: Jan. 15, 2015

(65) Prior Publication Data

US 2015/0199203 A1 Jul. 16, 2015

(30) Foreign Application Priority Data

Jan. 15, 2014 (KR) .................. 10-2014-0005063

(51) Int. Cl.
*G06F 3/048* (2013.01)
*G06F 9/451* (2018.01)
*H04B 5/00* (2006.01)
*H04W 76/14* (2018.01)
*H04W 4/80* (2018.01)

(52) U.S. Cl.
CPC .......... *G06F 9/453* (2018.02); *H04B 5/0031* (2013.01); *H04W 4/80* (2018.02); *H04W 76/14* (2018.02)

(58) Field of Classification Search
None
See application file for complete search history.

(56) References Cited

U.S. PATENT DOCUMENTS 9,098,369 B1 * 8/2015 Lewis .................. G06F 8/61
2005/0125729 A1 6/2005 Lee et al.
(Continued)

FOREIGN PATENT DOCUMENTS

KR 10-2013-0043747 5/2013
KR 10-2013-0050465 5/2013
(Continued)

OTHER PUBLICATIONS

European Search Report dated Nov. 27, 2015 issued in counterpart application No. 15151273.8-1954, 10 pages.
(Continued)

*Primary Examiner* — William C Trapanese
(74) *Attorney, Agent, or Firm* — The Farrell Law Firm, P.C.

(57) ABSTRACT

A method of and device for providing help information are provided. The method includes identifying information about a function from a video displaying the function and meta-information related to the video; determining whether the user device supports the function based on the identified information; activating, when the user device supports the function, a help function for the function; and outputting help information about the function. The device includes a touch screen; and a controller configured to identify information about a function from a video displaying the function and meta-information related to the video; determine whether the user device supports the function based on the identified information; activate, when the user device supports the function, a help function for the function; and control the touch screen to output help information about the function.

20 Claims, 9 Drawing Sheets

(56) References Cited

U.S. PATENT DOCUMENTS

| | | | |
|---|---|---|---|
| 2007/0281731 A1* | 12/2007 | Attride | H04M 1/72563 |
| | | | 455/550.1 |
| 2011/0021180 A1 | 1/2011 | Ray | |
| 2012/0259845 A1* | 10/2012 | Matejka | G06F 17/30528 |
| | | | 707/723 |
| 2013/0117781 A1 | 5/2013 | Kim et al. | |
| 2013/0129316 A1* | 5/2013 | Dontcheva | H04N 5/76 |
| | | | 386/241 |

FOREIGN PATENT DOCUMENTS

| WO | WO 99/46712 | 9/1999 |
|---|---|---|
| WO | WO 2011/149688 | 12/2011 |

OTHER PUBLICATIONS

European Search Report dated Jul. 22, 2015 issued in counterpart application No. 15151273.8-1954, 8 pages.

* cited by examiner

METHOD AND APPARATUS FOR PROVIDING HELP INFORMATION AND USER DEVICE ADAPTED TO THE METHOD

PRIORITY

This application claims priority under 35 U.S.C. § 119(a) to a Korean Patent Application filed on Jan. 15, 2014 in the Korean Intellectual Property Office and assigned Serial No. 10-2014-0005063, the entire contents of which are incorporated herein by reference.

BACKGROUND

1. Field of the Invention

The present invention relates generally to a method of and method for providing help information, and more particularly, to a method of and device for providing help information by identifying information about a function from a video and meta-information related to the video.

2. Description of the Related Art

The rapid development of information and communication technology and semiconductor technology has produced a variety of devices, where their use has also increased. User devices have been equipped with various functions, such as voice/video calling, music play back, text message transmission and reception, digital broadcast receiving, Near Field Communication (NFC), Internet access, etc. As user devices include more functions and more various functions, the use of these devices becomes more complicated, where users do not identify most of the functions and, thus, do not use their devices effectively. To resolve these problems, user devices have been equipped with functions for providing help information (or a help menu) according to conventional art.

However, in order to execute conventional help information providing functions in user devices, an application being executed must be turned off and the help application must be executed, which causes user inconvenience.

In general, various functions for user devices have been advertised via videos on mass-media, such as broadcast, Internet, etc. For example, when new user devices equipped with a new function are released, users can receive information about the function via advertisement. However, it is not sufficient to show the new function built into user devices via a video in a commercial advertisement, because it is typically only advertised for a limited period of time according to the characteristic of advertisement. Under this circumstance, users may not understand the new function.

SUMMARY

The present invention has been made to address the above-mentioned problems and disadvantages, and to provide at least the advantages described below. Accordingly, an aspect of the present invention provides a method of and device for activating, when a video for introducing or explaining functions of a user device is played back on the user device or on another user device, a help information function of the user device and providing help information of the user device.

In accordance with an aspect of the present invention, a method of providing help information of a user device is provided. The method includes identifying information about a function from a video displaying the function and meta-information related to the video; determining whether the user device supports the function based on the identified information; activating, when the user device supports the function, a help function for the function; and outputting help information about the function.

In accordance with another aspect of the present invention, a method of providing help information of a user device is provided. The method includes identifying information about a function from a video displaying the function and meta-information related to the video; transmitting the identified information about the function to at least one of an account server for managing an account of the user device, at least one other user device that establishes a communication channel with the user device, and a central management server where the user device is registered; receiving information about other user devices supporting the function from at least one of the account server, at least one user device, and the central management server; and creating help information for activating a help function and transmitting the help information to the other user devices supporting the function.

In accordance with another aspect of the present invention, a user device for providing help information is provided. The device includes a touch screen; and a controller configured to identify information about a function from a video displaying the function and meta-information related to the video; determine whether the user device supports the function based on the identified information; activate, when the user device supports the function, a help function for the function; and control the touch screen to output help information about the function.

In accordance with another aspect of the present invention, a user device for providing help information is provided. The device includes a Radio Frequency (RF) communication unit configured to transmit information about a function to at least one of an account server configured to manage the account of the user device, at least one user device having an established communication channel with the user device, a central management server where the user device is registered; and receive information about other user devices supporting the function from at least one of the account server, at least one user device, and the central management server; and a controller configured to identify information about a function from a video displaying the function and meta-information related to the video; and create help information for activating a help function and transmitting the help information to the other user devices supporting the function.

BRIEF DESCRIPTION OF THE DRAWINGS

The above and other aspects, features and advantages of the invention will be more apparent from the following detailed description, taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. In the drawings, the same or similar elements are denoted by the same reference numerals even though they are depicted in different drawings. In the following description, a detailed description of known functions, configurations, and operations incorporated herein is omitted when it may make the subject matter of the invention less clear.

Figure 1:
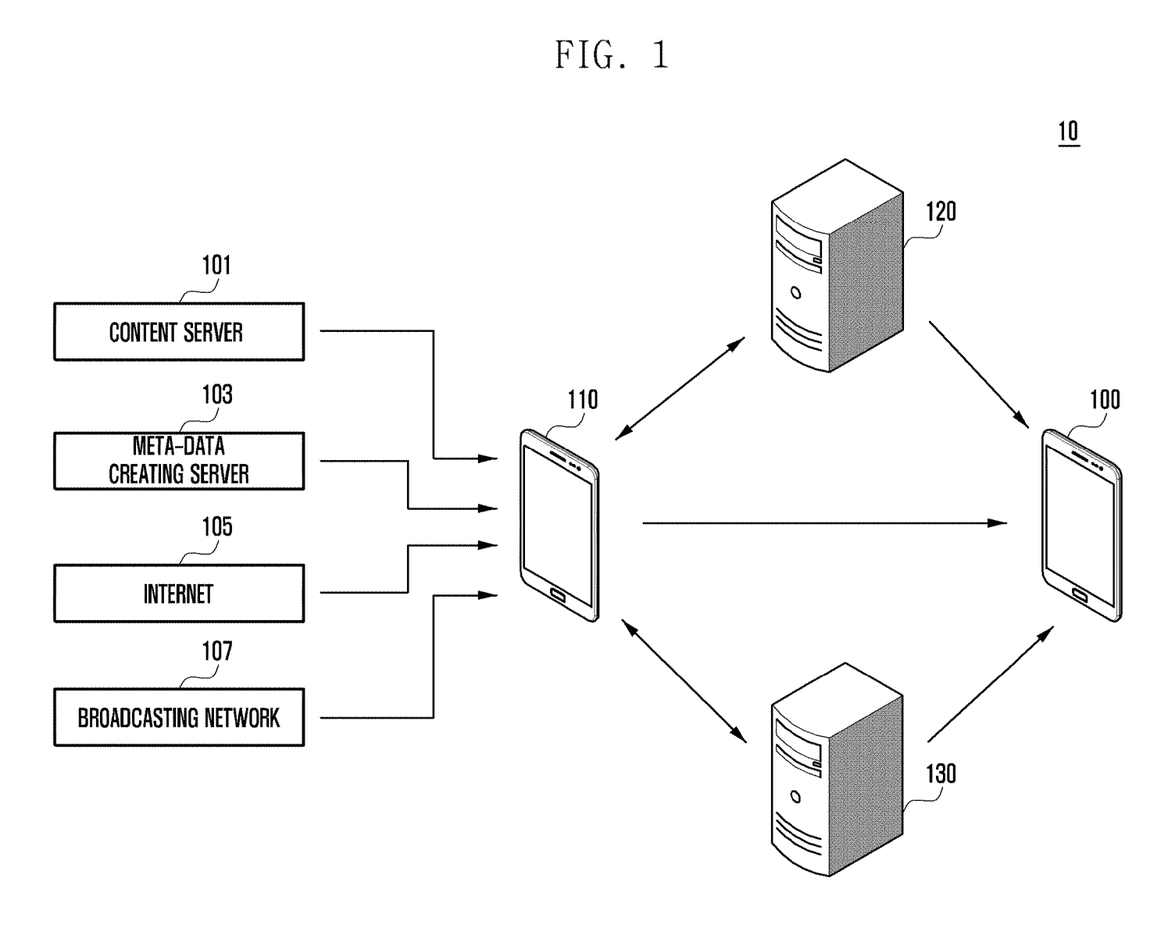
FIG. 1 is a diagram of a system for providing help information of a user device according to an embodiment of the present invention.

FIG. 1 is a diagram of a system 10 for providing help information of a user device according to an embodiment of the present invention.

Referring to FIG. 1, the system 10 for activating a help function of a user device includes a first user device 100, a second user device 110, an account server 120, and a central management server 130. The first user device 100 and the second user device 110 are each equipped with computing resources. Examples of the first user device 100 and the second user device 110 include smartphones, tablet Personal Computers (PCs), digital cameras, displays, Personal Digital Assistants (PDAs), electronic-organizers, desktop computers, Portable Multimedia Players (PMPs), media players (e.g., Moving Picture Experts Group Audio Layer 3 (MP3) players), audio systems, wrist watches, game consoles, etc.

The first user device 100 receives help information from the second user device 110, account server 120, central management server 130, etc. The help information may be information that is created based on a video, etc., played back on the second user device 110. The help information may also be information that activates a help function for a function of a user device, where the help information is output via a video being played back. It should be understood that the present invention is not limited to a particular function of a user device, where the particular function is output via a video being played back. The help information may include application information that is updated and output via a video being played back or information about functions of a user device that are compatible and output via a video being played back.

The first user device 100 determines whether it supports (i.e., can execute) a function corresponding to help information based on received help information. For example, the first user device 100 determines whether it supports a function by searching a program table, application table, etc. When the first user device 100 ascertains that it supports the function in question, it activates a help function and outputs help information corresponding to the function. For example, the first user device 100 activates an application for providing a help function and outputs help information for a function via the activated application. The first user device 100 outputs a help icon for the function. The first user device 100 outputs help information in the form of text or an image.

In an embodiment of the present invention, when the first user device 100 stores received help information and is turned on or a function corresponding to help information is executed, the help function for the function is activated. When the first user device 100 executes a user device function that can create the same result as the function corresponding to help information, it activates a help function corresponding to the function. For example, if a function corresponding to help information is a function for transmitting files via NFC, the first user device 100 activates a help function for the file transmission function with NFC when executing a Bluetooth function for transmitting files which is the same as the file transmission with NFC. If the first user device 100 executes a function in such a manner, part of which is identical to the manner for executing the function corresponding to help information, it activates a help function corresponding to the function corresponding to the help information. For example, a function may be set in such a way that tapping the right/left side of the body of the first user device 100 causes the screen to scroll. In this case, when the first user device 100 detects a user's input tapping the top/bottom of the body and/or receives an input tapping the right/left side of the body, it activates a help function for a screen scrolling function. When the first user device 100 executes a user device function that can create the same result as the function corresponding to help information or a function in such a manner, part of which is identical to the manner for executing the function corresponding to help information, it activates a help function for the function corresponding to the help information. Therefore, although a user does not determine whether his/her device supports a function corresponding to help information via a video that is being played back or a method of executing the function corresponding to help information, the user device provides information as to whether it supports the function corresponding to help information and a description regarding the function corresponding to help information.

The second user device 110 receives videos from various media and plays them back. The second user device 110 creates help information based on videos and meta-information related to the videos, and transmits the help information to the first user device 100.

In particular, the second user device 110 receives meta-information and video information from at least one of a content server 101, a meta-information creating server 103, the Internet 105, and a broadcasting network 107, and plays them back. For example, the second user device 110 receives video contents. The second user device 110 also receives information related to the contents, i.e., meta-information for describing or searching contents, from the content server 101. The second user device 110 analyzes the received meta-information. The meta-information may include information about functions of user device, update information about applications, information about functions compatible with a user device, logos, trademarks of a user device output via a video played back, manufacturers' names of user devices, manufacturers' Uniform Resource Locators (URLs), etc. In particular, information about a function of a user device may include a name of the function and information about a manner for executing a function of user device. For example, if a function of a user device is a function for transmitting files via NFC and its name is "S-beam function," the meta-information may include "S-beam function" as a name, and "NFC" as a function executing manner.

In an embodiment of the present invention, if information about a function of a user device is output only for part of the entire period of time for playing back the entire video, the meta-information may include information about the time period during which the information about the function of the user device is output. In particular, meta-information may include significant time frames. A significant time frame refers to a time interval to check function information of a user device within a period of time during which a video for the function of a user device is played back. When the second user device 110 plays a video back to show information about a number of functions of a user device, the meta-information may include significant time frames related to information about the functions. When the second user device 110 plays a video back to output information about a number of functions of a user device, it creates help information each time that video for a function is output or after video for all the functions is output, and transmits it to the first user device 100.

The second user device 110 receives both video information about contents and the meta-information from the content server 101. The second user device 110 receives video information from the content server 101 and the meta-information related to the video contents from a meta-information creating server 103. The second user device 110 may receive videos that a third party user has uploaded and the meta-information related to the videos via the Internet 105. For example, if a third party user has posted videos for explaining functions of a user device to a blog, the second user device 110 may play the videos back on the blog. In this case, the second user device 110 may download the videos and the meta-information from the blog. In particular, the second user device 110 may receive broadcast information via the broadcasting network 107. It should be understood that the content server 101, meta-information creating server 103, the Internet 105 and the broadcasting network 107 serve are examples for describing the present invention. Video information and meta-information may include videos that the user, third party users, and contents providers are providing and meta-information related to the videos.

In an embodiment of the present invention, the second user device 110 searches for a user device with a function via the account server 120 or may establish a network channel with user devices. The second user device 110 may also search for a user device with a function via the central management server 130. The second user device 110 transmits the created help information to a searched user device, e.g., a first user device 100.

The account server 120, which has registered a number of user devices, searches the registered user devices for a user device with a function via the video content played back on the second user device 110. More specifically, when a user has a number of user devices including the first user device 100 and the second user device 110 and registers them in the account server 120, the account server 120 may search the registered user devices for a user device with a function, e.g., the first user device 100. The account server 120 transmits the information about a function that the searched first user device 100 supports, i.e., the information about the first user device 100, to the second user device 110. In an embodiment of the present invention, the account server 120 may directly create help information about a function and transmit it to the first user device 100.

The central management server 130 searches a number of user devices, registered in services of the central management server 130, for a user device with a function, e.g., a first user device 100, via a video played back in the second user device 110. For example, if the central management server 130 is a location-based service providing server and a number of user devices are located around the second user device 110 providing videos, the central management server 130 receives information about a function, identified via a video played back, the meta-information, and location information about the second user device 110 from the second user device 110. The central management server 130 searches user devices for at least one first user device 100, which supports a function output via a video played back and is located near the second user device 110, based on location-based service subscription information. The central management server 130 transmits information about a function that the first user device 100 supports, i.e., information about a function supporting user device, to the second user device 110. In an embodiment of the present invention, the central management server 130 directly creates help information about a function and transmits the help information to the first user device 100.

Figure 2:
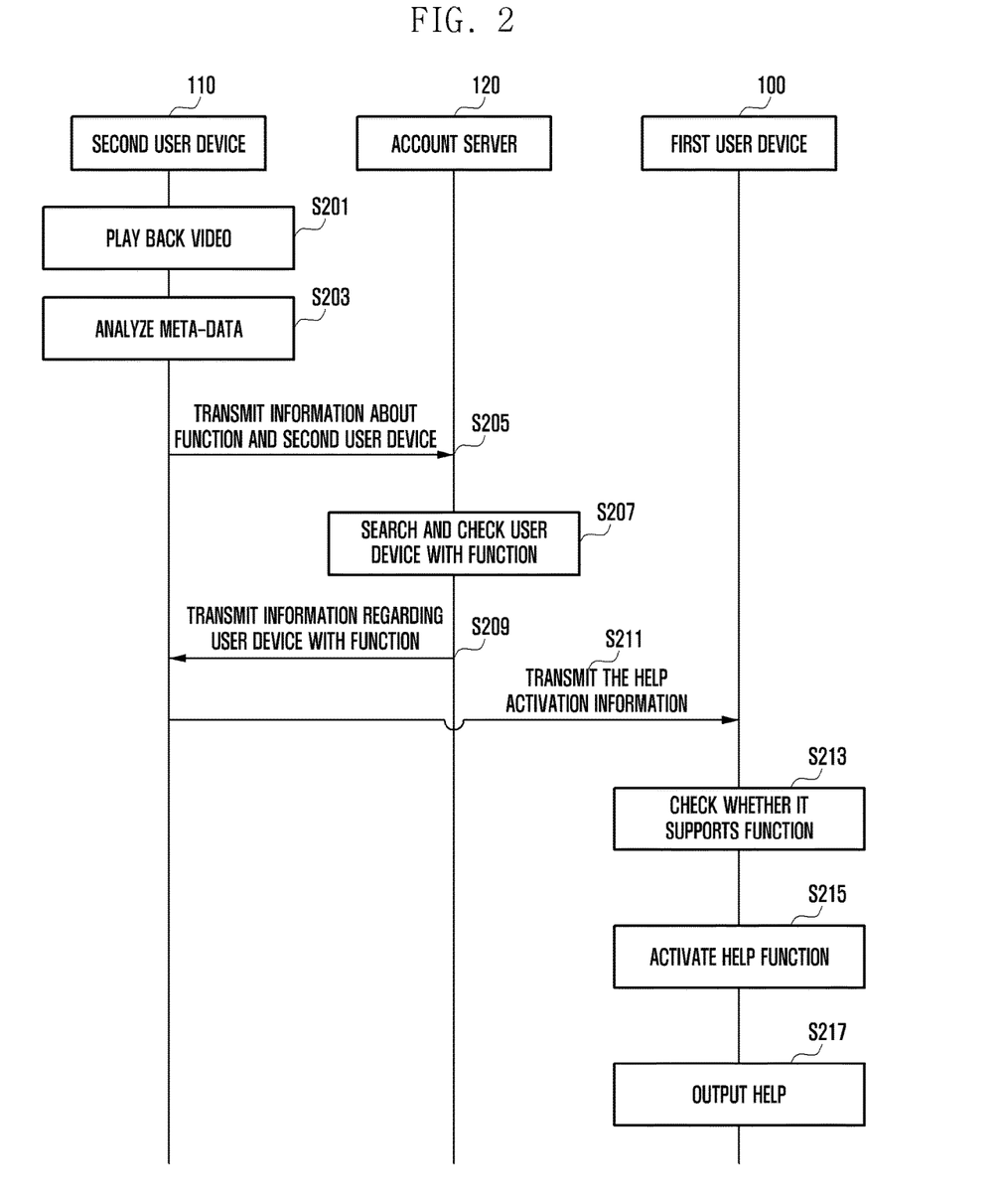
FIG. 2 is a flow chart of a method of providing help information of a user device according to an embodiment of the present invention.

FIG. 2 is a flow chart of a method of providing help information of a user device according to a first embodiment of the present invention. The system 10 for providing help information of a user device may be applied to an environment where a user has a number of user devices including first user device 100 and second user 110, where they have been registered in the account server 120.

Referring to FIG. 2, the second user device 110 receives videos and meta-information related to the videos via a content server 101, a meta-information creating server 103, the Internet 105 and a broadcasting network 107, and plays them back in step S201. The videos played back may be videos related to, for example, a function of a user device, an application update, or functions compatible with a user device. The second user device 110 may play back a video combined with meta-information via the content server 101, the Internet 105 and the broadcasting network 107. While the second user device 110 is playing back a video, it may receive, in real-time, the meta-information from the meta-information creating server 103. In an embodiment of the present invention, the meta-information may include information about functions of a user device, update information about applications, information about functions compatible with a user device, logos, trademarks of a user device output via a video played back, manufacturers' names of user devices, manufacturers' URLs, etc. In particular, information about a function of a user device may include a name of a function of the user device and information about a manner for executing a function of user device. In particular, meta-information may include significant time frames. A significant time frame refers to a time interval to check function information of a user device within a period of time during which the function of the user device is executed.

The second user device 110 analyzes the meta-information in step S203. The second user device 110 analyzes the meta-information, i.e., significant time frame, thereby identifying the information about a function of user device, etc., output via a video played back.

The second user device 110 transmits information about a function of a user device identified from the meta-information, and information about the second user device 110 to the account server 120 in step S205. For example, the second user device 110 transmits information about a function of a user device identified from the meta-information, and user information about the second user device 110 or unique device identifier (ID) of the second user device 110, etc., to the account server 120.

The account server 120, which registered a number of user devices, searches the registered user devices for a user device with a function, e.g., a first user device 100, and identifies the user device in step S207. For example, the account server 120 checks user information about the second user device 110, searches a number of user devices registered in the second user device 110 for a first user device 100 with a function, and identifies the first user device 100.

The account server 120 transmits the information about a user device with the function to the second user device 110 in step 209. That is, the account server 120 transmits information about the first user device 100 that supports the function, from among user devices registered in the user's account of the second user device 110, to the second user device 110.

The second user device 110 creates help information and transmits it to the first user device 100 in step S211. More specifically, the second user device 110 receives information about a user device supporting the function from the account server 120, and creates help information, i.e., information for activating a help function corresponding to the function of a user device displayed via a video being played back. The second user device 110 transmits the information for activating a help function to a user device supporting the function and the first user device 100. Although it is not shown in FIG. 2, the account server 120 may directly create help information and transmit it to the first user device 100 supporting the function, without performing steps S209 and S211.

The first user device 100 determines whether it supports the function corresponding to the help function based on the received help information in step S213. When the first user device 100 can support the function, it activates the help function in step S215. An embodiment of the present invention may omit step S213. That is, when the first user device 100 receives help information in step S211, it activates the help function in step S215. In an embodiment of the present invention, the first user device 100 stores the received help information and automatically activates the help function for the function according to at least one of the following cases: where the first user device 100 is turned from off to on; the function corresponding to the help information is executed; a user device function is executed that can create the same result as the function corresponding to the help information; and a manner is executed part of which is identical to the manner for executing the function.

The first user device 100 outputs activated help information about the function in step S217. For example, the first user device 100 outputs a help icon for the function or help information in the form of text or an image.

Figure 3:
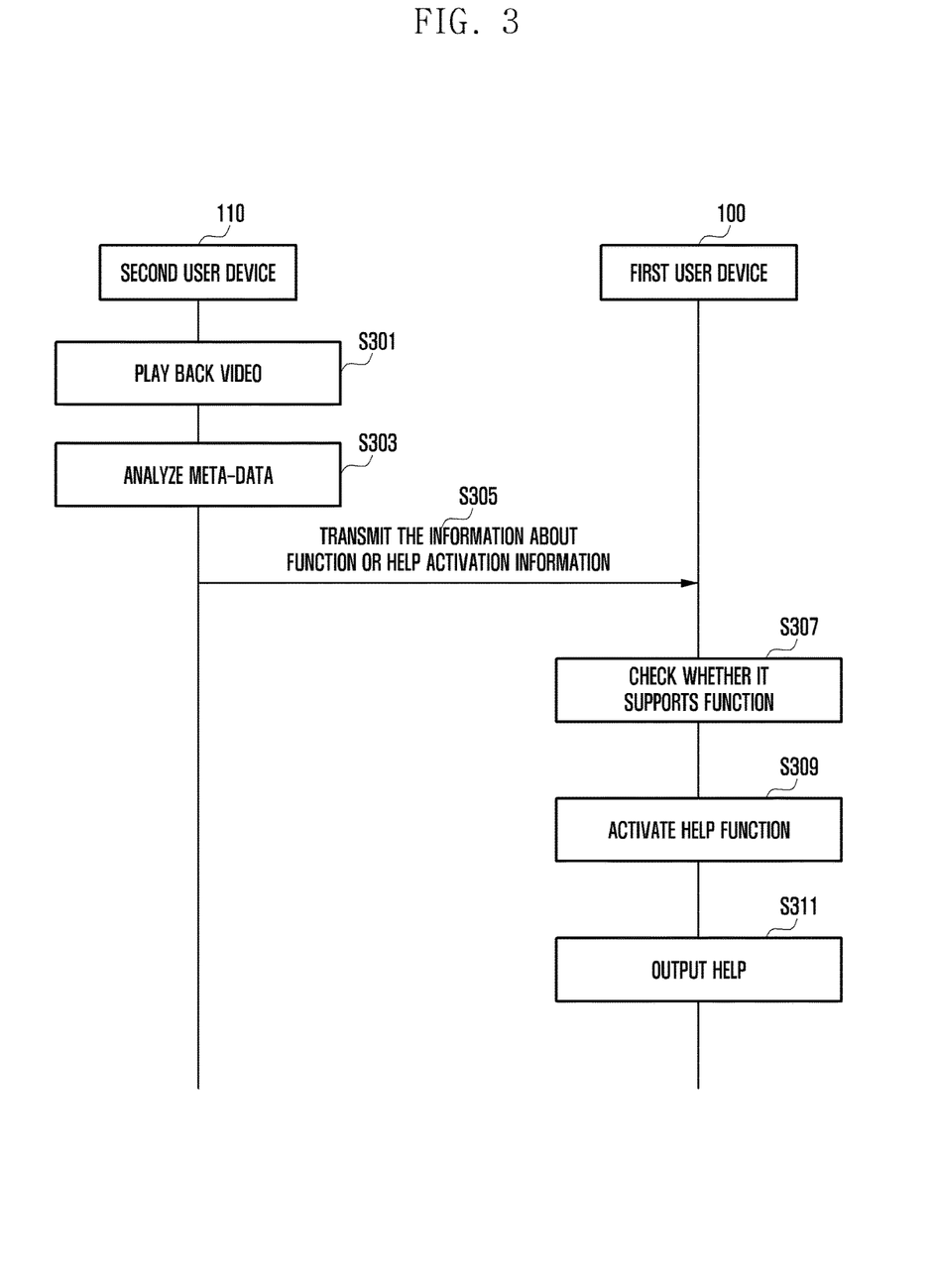
FIG. 3 is a flow chart of a method of providing help information of a user device according to an embodiment of the present invention.

FIG. 3 is a flow chart of a method of providing help information of a user device according to an embodiment of the present invention.

Referring to FIG. 3, the second user device 110 receives videos and meta-information related to the videos via a content server 101, a meta-information creating server 103, the Internet 105 and a broadcasting network 107, and plays back the received video contents in step S301. The second user device 110 analyzes the meta-information in step S303. Since steps S301 and S303 are the same as step S201 and S203 shown in FIG. 2, their detailed description is omitted.

The second user device 110 transmits help information to at least one user device after establishing a communication channel with the network in step S305. More specifically, the second user device 110 establishes a data communication channel with at least one user device, e.g., a first user device 100, and transmits help information via the established channel. For example, the second user device 110 transmits help information to at least one user device that is connected to an access point or connected to a network that the second user device 110 connects to. In an embodiment of the present invention, the second user device 110 establishes a channel with at least one user device, e.g., a first user device 100, via an NFC module, and transmits help information to the at least one user device. For example, the second user device 110 broadcasts information about the activation of help information to at least one user device via short range communication, such as Bluetooth, Wireless Fidelity (Wi-Fi) direct, etc.

It should be understood that the invention is not limited to the embodiments of the present invention. That is, It should be understood that the present invention includes a case where the second user device 110 has already established a communication channel with at least one user device, and a case where the second user device 110 transmits a message to establish a communication channel to at least one user device, and transmits information about the activation of help information.

The first user device 100 receives help information and determines whether it supports a function corresponding to the received help information in step S307. When the first user device 100 ascertains that it supports a function corresponding to the received help information, it activates the help function in step S309. The first user device 100 outputs activated help information about the function in step S311.

Although it is not shown in FIG. 3, the second user device 110 may transmit information for searching for a user device supporting a function to at least one user device, instead of performing step S305 in which the second user device 110 transmits help information to the first user device 100. The first user device 100 supporting the function receives the search information and transmits information for identifying the function to the second user device 110. After receiving the identifying information from the first user device 100, the second user device 110 creates help information about the function and transmits it to the first user device 100. The first user device 100 identifies whether it supports the function corresponding to the help information, activates the help function, and outputs the help information about the function, in steps S307 to S311.

Figure 4:
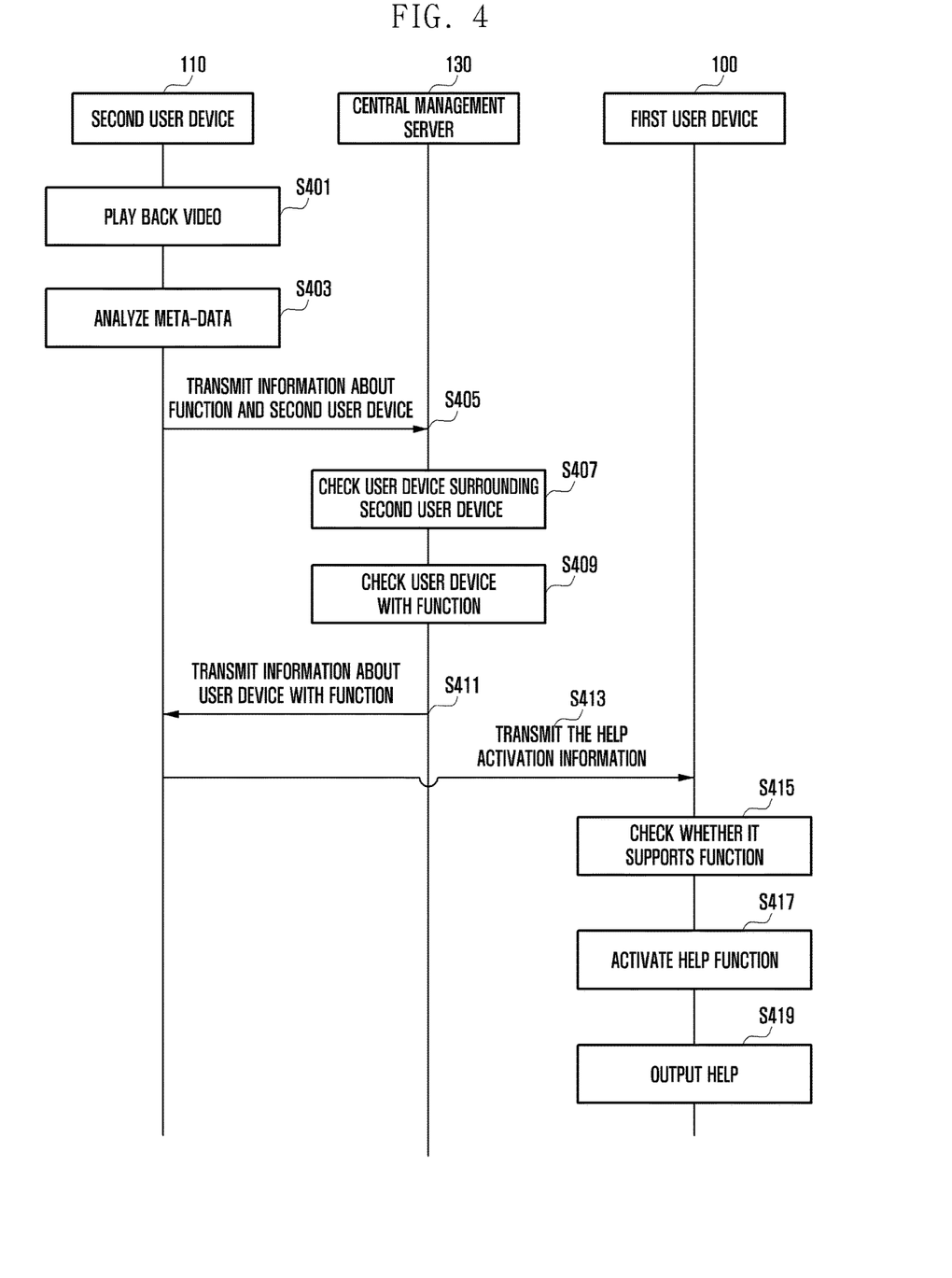
FIG. 4 is a flow chart of a method of providing help information of a user device according to an embodiment of the present invention.

FIG. 4 is a flow chart of a method of providing help information of a user device according to an embodiment of the present invention. The system 10 for providing help information of a user device may be applied to an environment where a number of user devices including a first user device 100 are registered or subscribed in services of the central management server 130. That is, the central management server 130 stores and manages information about a first user device 100 that has been registered or subscribed in the services. In the following description, an embodiment of the present invention describes the central management server 130 as a location-based service providing server. However, it should be understood that the present invention is not limited to the embodiment but may include servers that provide various services.

Referring to FIG. 4, the second user device 110 receives videos and meta-information related to the videos via a content server 101, a meta-information creating server 103, Internet 105 and a broadcasting network 107, and plays back the received videos back in step S401. The second user device 110 analyzes the meta-information in step S403.

Since steps S401 and S403 are the same as steps S201 and S203 shown in FIG. 2, their detailed description is omitted.

The second user device 110 transmits information about a function and location information about the second user device 110, displayed during play back of a video, to the central management server 130 in step S405.

The central management server 130 identifies at least one user device, registered in a location-based service, around the second user device 110, e.g., a first user device 100, based on the received location information about the second user device 110 in step S407.

The central management server 130 searches a number of user devices, registered in a location-based service around the second user device 110, for at least one user device supporting a function, e.g., a first user device 100, based on the information about the function transmitted from the second user device 110, and identifies the at least one user device in step S409. More specifically, the central management server 130 identifies subscription information about a number of user devices, registered in a location-based service, e.g., device information about a user device and information about a subscriber of a user device, included in the subscription information, searches for at least one user device supporting the function, e.g., a first user device 100, and identifies the subscription information.

The central management server 130 transmits information about the first user device 100 supporting the function, around the second user device 110, to the second user device 110 in step S411.

The second user device 110 transmits information about the activation of a help function to the first user device 100 in step S413. The first user device 100 determines whether is supports the function corresponding to a help function based on the received activation information in step S415. When the first user device 100 ascertains that it supports a function, it may activate the help function in step S417 and output activated help information in step S419.

Figure 5:
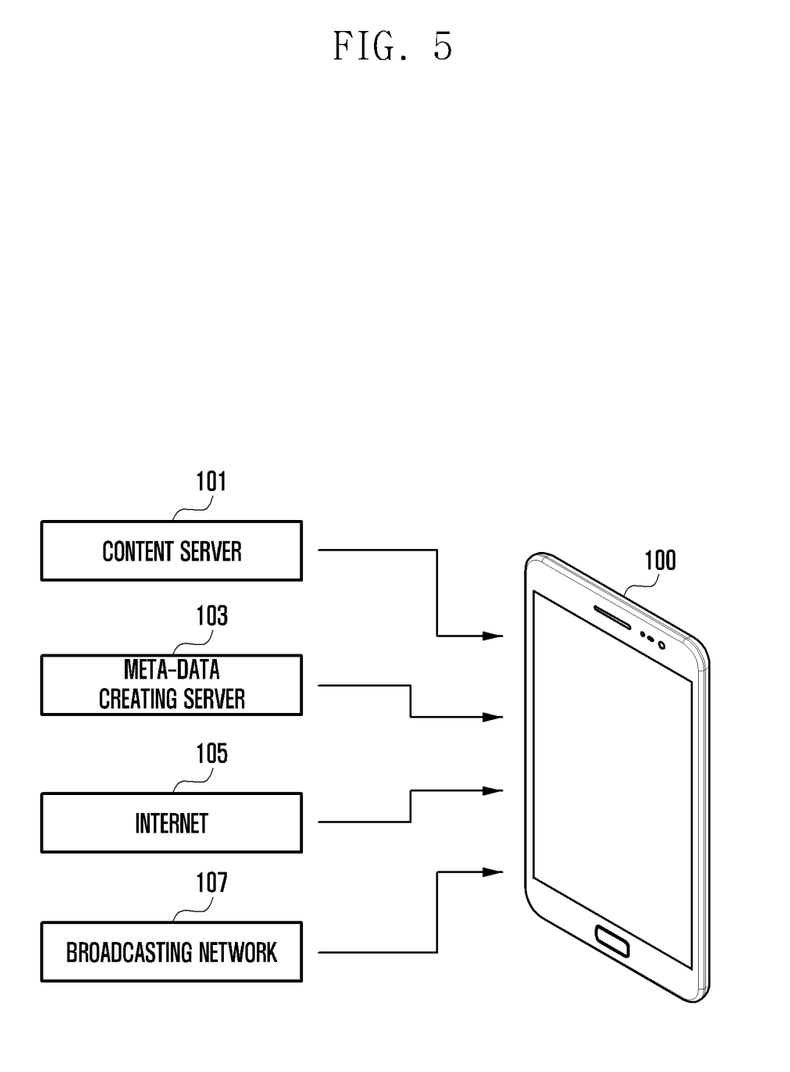
FIG. 5 is a diagram of a system for providing help information of a user device according to an embodiment of the present invention.

FIG. 5 is a diagram of a system for providing help information of a user device according to an embodiment of the present invention. Unlike the embodiment shown in FIG. 1, the embodiment of FIG. 5 describes the operation of the first user device 100 where it receives videos from the content server 101, meta-information creating server 103, the Internet 105 and broadcasting network 107, and plays them back. The first user device 100 of FIG. 5 may perform all the functions of the first user device 100 and the second user device 110 of FIG. 1. Therefore, the description provided above that refers to FIG. 1 is omitted.

The first user device 100 receives videos and meta-information related to the videos from the content server 101, meta-information creating server 103, the Internet 105 and broadcasting network 107. The meta-information includes significant time frames. A significant time frame refers to a time interval to check function information of a user device within a period of time during which the function of user device is executed. The second user device 110 analyzes a significant time frame and identifies the information about a function.

The first user device 100 receives the identified information about a function and determines whether it supports the function based on the identified information. When the first user device 100 ascertains that it supports the function, it activates the help function corresponding to the function and outputs the help information for the function.

Figure 6:
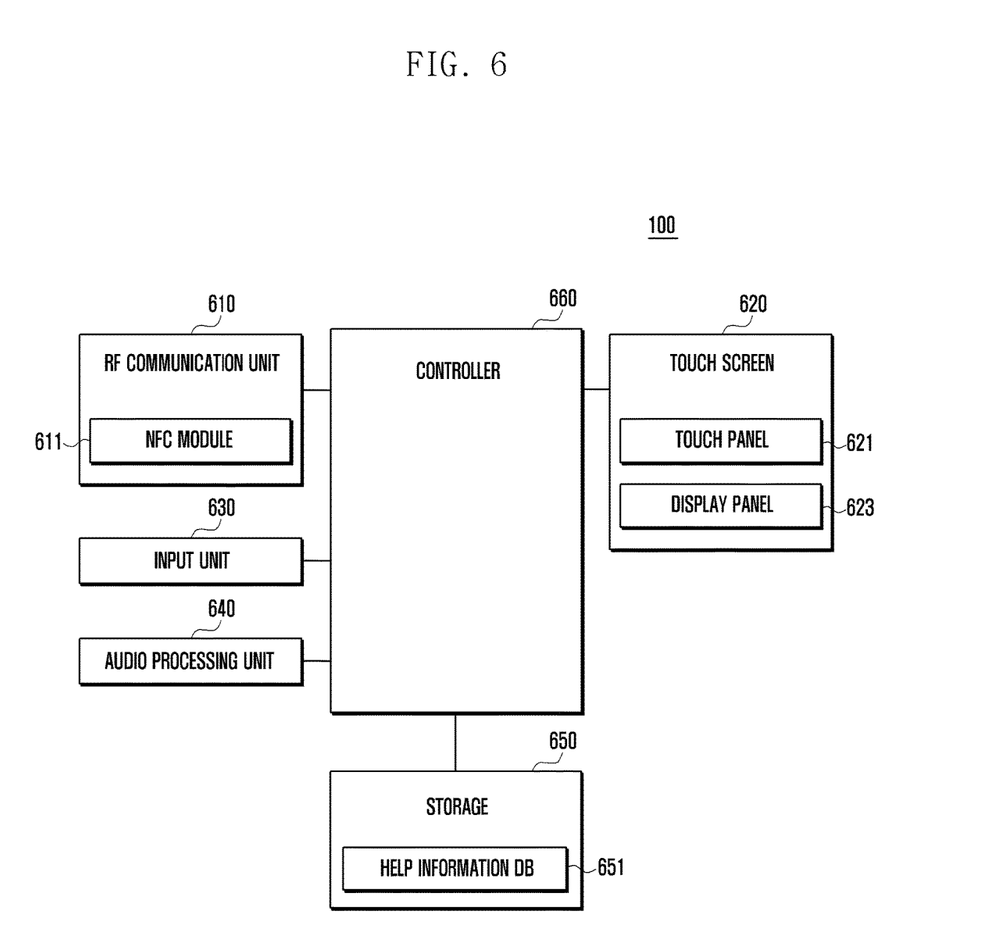
FIG. 6 is a schematic block diagram of a first user device according to an embodiment of the present invention.

FIG. 6 is a schematic block diagram of a first user device according to an embodiment of the present invention.

Referring to FIG. 6, the first user device 100 includes an Radio Frequency (RF) communication unit 610, a touch screen 620, an input unit 630, an audio processing unit 640, storage 650, and a controller 660.

The RF communication unit 610 establishes communication channels with networks (e.g., a mobile communication network, etc.) for RF communication such as a voice/video call, etc., or message service-based data communication such as Short Message Service (SMS), Multimedia Messaging Service (MMS), Internet access, etc., under the control of the controller 660, and performs transmission/reception of signals via the channels, under the control of the controller 660. The RF communication unit 610 includes an RF transmitter for up-converting the frequency of signals to be transmitted and amplifying the signals and an RF receiver for low-noise amplifying received RF signals and down-converting the frequency of the received RF signals. The RF communication unit 610 establishes data communication channels for message services under the control of the controller 660, and performs transmission/reception of message service-based data via the channels. The communication channel includes mobile communication channels and Internet communication channels. Examples of the mobile communication channels are Code Division Multiple Access (CDMA), Time Division Multiple Access (TDMA), Orthogonal Frequency Division Multiple Access (OFDMA), etc. Examples of the Internet communication channels are a wired Internet, wireless Internet, etc.

In an embodiment of the present invention, the RF communication unit 610 receives videos and meta-information related to the videos from the content server 101, meta-information creating server 103, the Internet 105 and broadcasting network 107. The RF communication unit 610 transfers the received videos and meta-information related to the videos to the controller 660.

The RF communication unit 610 further includes an NFC module 611. The NFC module 611 establishes an NFC channel with the second user device 110 via Bluetooth, Wi-Fi direct, etc. under the control of the controller 660. The NFC module 611 receives help information from the second user device 110 via the established channel under the control of the controller 660 and transfers the help information to the controller 660.

The touch screen 620 provides various screens related to the operations of the first user device 100, e.g., idle screen, menu screen, screens shown when applications are executed, etc. The touch screen 620 includes a touch panel 621 and a display panel 623. The touch panel 621 may be implemented with an add-on type of touch panel placed on the display panel or an in-cell type of touch panel inserted in the display panel.

The touch panel 621 creates an analog signal when the user touches the touch panel 621 or a touch event occurs thereon, converts the touch or touch event to a digital signal, and transfers it to the controller 660.

The display panel 623 displays data on the touch screen 620 according to the control of the controller 660. For example, when the controller 660 processes data (e.g., decodes data) and stores it in a buffer, the display panel 623 converts the stored data into analog signals and displays the analog signal on the touch screen 620. The display panel 623 may also display a variety of screens related to the operations of a user device according to the control of the controller 660, e.g., a lock screen, a home screen, an application execution screen, a menu screen, a keypad screen, a message writing screen, an Internet screen, etc.

In an embodiment of the present invention, the display panel 623 outputs help information according to the control of the controller 660. When the touch screen 620 receives help information about a function of a user device, output from the video being played back via the first user device 100 or the second user device 110, the display panel 623 displays the received help information according to the control of the controller 660. For example, the display panel 623 may output a help icon for the function or help information in the form of text or an image.

The display panel 623 may be implemented with a Liquid Crystal Display (LCD), Active Matrix Organic Light Emitting Diodes (AMOLEDs), Passive Matrix Organic Light Emitting Diodes (PMOLEDs), a flexible display, a transparent display, or the like.

The input unit 630 creates input signals for operating the first user device 100. The input unit 630 may include various input systems, such as a keyboard, a keypad, key buttons, etc., according to the compatibility of the first user device 100. The input unit 630 may also be implemented with a touch map that can be displayed on the touch screen 620.

The audio processing unit 640 outputs audio data set in the process of operating the first user device 100, audio data when audio files stored in the storage 650 are played back, audio data transmitted from the external system, etc. In an embodiment of the present invention, when the first user device 100 can support a function of a user device corresponding to help information, the audio processing unit 640 may output a notification sound or sound effect notifying that it can support the function.

The storage 650 serves as a secondary memory unit of the controller 660 and may include disc, Random Access Memory (RAM), flash memory, etc. The storage 650 may store data created in the first user device 100 or data that is received via the RF communication unit 610 or an external interface (not shown), from external systems, e.g., servers, computers, etc., according to the control of the controller 660. The storage 650 may also store video data, game data, music data, movie data, map data, etc.

In an embodiment of the present invention, the storage 650 may include a help information database (DB) 651. The help information DB 651 may store help information that the first user device 100 receives. For example, the help information DB 651 may store a function of a user device, displayed via a video being played back in the first user device 100 or the second user device 110, updated information about applications, and information about functions of a user device that is compatible with the first user device 100, displayed via a video being played back. The help information DB 651 provides help information to the controller 660 in order to activate a help function, according to the control of the controller 660, for one of the following cases: where the first user device 100 is turned from off to on or a function corresponding to the help information is executed; another user device function is executed that can create the same result as the function corresponding to the help information in the first user device 100; and is executed in such a manner that a part of which is identical to the manner for executing the function.

The controller 660 controls the entire operation of the first user device 100 and signal flows among the components in the first user device 100. The controller 660 may also process data in the first user device 100. For example, the controller 660 may include a Central Processing Unit (CPU), an Application Processor (AP), etc. The controller 660 may also be implemented with a single core processor or a multi-core processor.

In an embodiment of the present invention, the controller 660 plays back videos, based on videos and meta-information related to the videos received via the RF communication unit 610. The controller 660 identifies information about a function of a user device, displayed via a video being played back, and determines whether the first user device 100 supports the function. In an embodiment of the present invention, the controller 660 receives help information from the second user device 110 and determines whether to support a function corresponding to the received help information. When the controller 660 ascertains that it supports the function corresponding to the received help information, it activates the help function and outputs the help information for the function.

Figure 7:
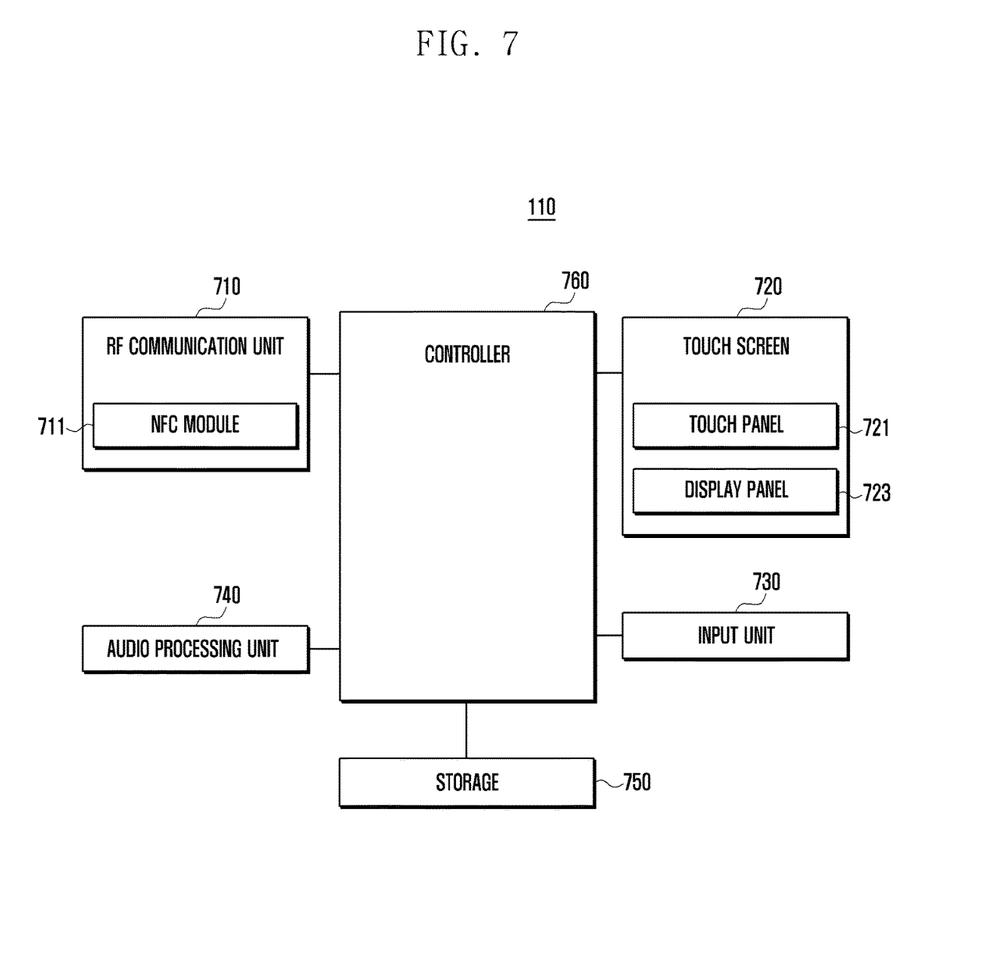
FIG. 7 is a schematic block diagram of a second user device according to an embodiment of the present invention.

FIG. 7 is a schematic block diagram of a second user device according to an embodiment of the present invention.

Referring to FIG. 7, the second user device 110 includes an RF communication unit 710, a touch screen 720, an input unit 730, an audio processing unit 740, storage 750, and a controller 760.

The RF communication unit 710 establishes communication channels with networks (e.g., a mobile communication network, etc.) for message service-based data communication, under the control of the controller 760, and performs transmission/reception of signals via the channels, under the control of the controller 760. The RF communication unit 710 includes an RF transmitter for up-converting the frequency of signals to be transmitted and amplifying the signals and an RF receiver for low-noise amplifying received RF signals and down-converting the frequency of the received RF signals. The RF communication unit 710 receives videos and meta-information related to the videos from the content server 101, meta-information creating server 103, the Internet 105 and broadcasting network 107. The RF communication unit 710 transfers the received videos and meta-information related to the videos to the controller 760. The RF communication unit 710 further includes an NFC module 711. The NFC module 711 establishes an NFC channel with the first user device 100 via Bluetooth, Wi-Fi direct, etc., under the control of the controller 760. The NFC module 711 transfers help information to the first user device 100 via the established channel under the control of the controller 760.

The touch screen 720 provides various screens related to the operations of the second user device 110, e.g., idle screen, menu screen, screens shown when applications are executed, etc. The touch screen 720 includes a touch panel 721 and a display panel 723. The touch panel 721 creates an analog signal when the user makes a touch or a touch event occurs thereon, converts the touch or touch event to a digital signal, and transfers the digital signal to the controller 760. The display panel 723 displays data on the screen according to the control of the controller 760. For example, when the controller 760 processes data (e.g., decodes data) and stores the processed data in a buffer, the display panel 723 converts the stored data to analog signals and displays the analog signals on the screen. In an embodiment of the present invention, the display panel 723 displays information about a function of a user device, displayed via a video being played back, e.g., advertisements, etc., based on videos and meta-information related to the videos, under the control of the controller 760. It should be understood that the present invention is not limited to the information about a function of a user device, displayed via a video being played back. It should be understood that the present invention may include updated information about applications, displayed via a video being played back, or information about functions of a user device that are compatible, displayed via a video being played back.

The input unit 730 creates input signals for operating the second user device 110. The input unit 730 may include various input systems, such as a keyboard, a keypad, key buttons, etc., according to the compatibility of the second user device 110. The input unit 730 may also be implemented with a touch map that can be displayed on the touch screen 720.

The audio processing unit 740 outputs audio data set in the process of operating the second user device 110, audio data when audio files stored in the storage 750 are played back, audio data transmitted from the external system, etc.

The storage 750 serves as a secondary memory unit of the controller 760 and may include disc, RAM, flash memory, etc. The storage 750 stores data created in the second user device 110 or data that is received via the RF communication unit 710 or an external interface (not shown), from external systems, e.g., servers, computers, etc., under the control of the controller 760. The storage 750 may also store video data, game data, music data, movie data, map data, etc.

The controller 760 controls the entire operation of the second user device 110 and signal flows among the components in the second user device 110. The controller 760 may also process data in the second user device 110. For example, the controller 760 may include a Central Processing Unit (CPU), an Application Processor (AP), etc. The controller 760 may also be implemented with a single core processor or a multi-core processor.

In an embodiment of the present invention, the controller 760 plays back videos, based on videos and meta-information related to the videos received via the RF communication unit 710. The controller 760 analyzes the received meta-information. The meta-information includes information about functions of a user device, update information about applications, information about functions of a compatible user device, logos, trademarks of a user device output via a video played back, manufacturers' names of user devices, manufacturers' URLs, etc. In particular, information about a function of a user device may include a name of a function of a user device and information about a manner for executing a function of a user device. In an embodiment of the present invention, if information about a function of a user device is output only for part of the entire period of time for playing back the entire video, the meta-information includes information about the time period during which the information about the function of the user device is output. In particular, meta-information may include significant time frames. A significant time frame refers to a time interval to check function information of a user device within a period of time during which video for the function of the user device is played back. When a video is played back to show information about a number of functions of a user device, the meta-information includes significant time frames related to information about the functions. When a video is played back to output information about a number of functions of a user device, the controller 760 creates help information each time that video for each of the functions is output or after video for all the functions is output, and transmits the help information to the first user device 100.

The controller 760 analyzes meta-information. The controller 760 transmits information about a function of a user device and information about the second user device 110, identified by the meta-information, to the account server 120, via the RF communication unit 710, in order to search for a user device supporting a function displayed via a video being played back. When the controller 760 ascertains that the account server 120 has searched for and identified a user device supporting a function, it creates help information and transmits the help information to the identified user device. The controller 760 establishes at least one user device, e.g., a first user device 100, with a data communication channel and transmits help information via the established channel. For example, the controller 760 transmits help information to at least one user device that is connected to an access point or connected to a network that the device of the controller 760 connects to. The controller 760 broadcasts information about the activation of help information to at least one user device via short range communication, such as Bluetooth, Wi-Fi direct, etc. The controller 760 transmits information about a function displayed via a video being played back and location information about the second user device 110 to the central management server 130. When the controller 760 ascertains that the central management server 130 has searched for and identified a user device that supports the function and is located around the second user device 110, e.g., a first user device 100, it transmits help information to the first user device 100.

Figure 8:
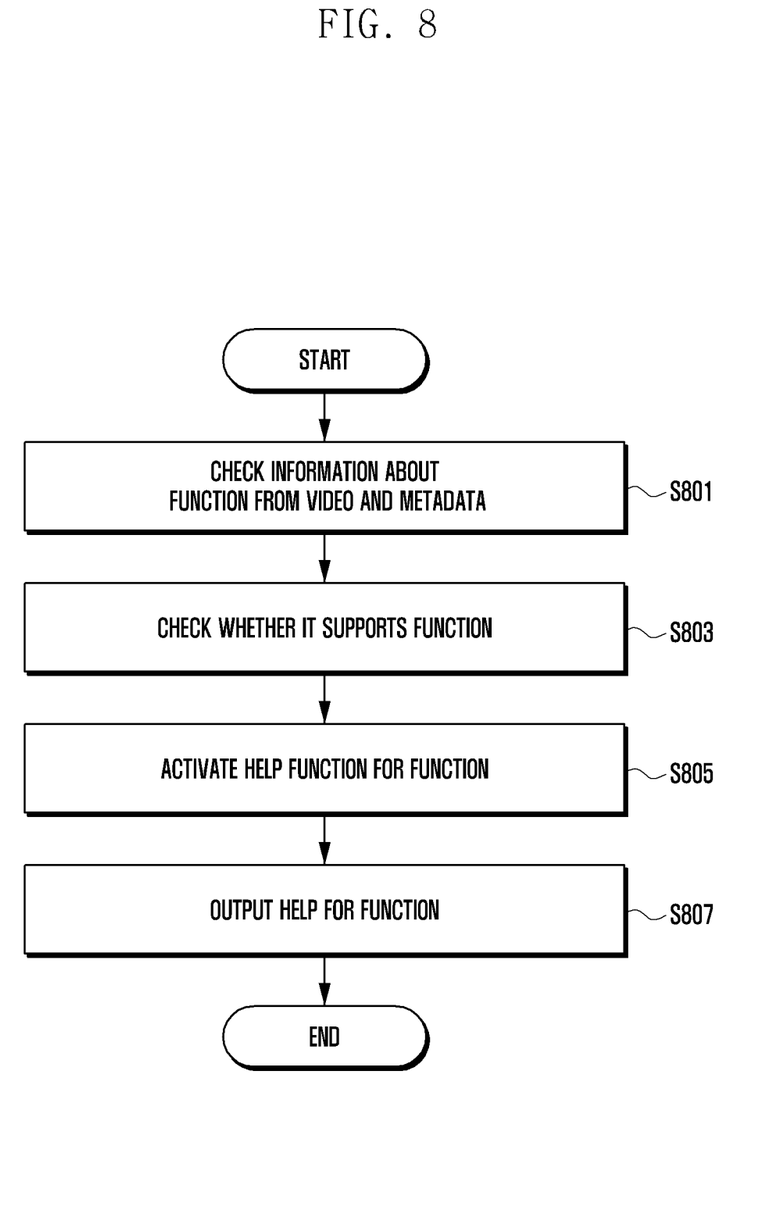
FIG. 8 is a flow chart of a method of providing help information of a first user device according to an embodiment of the present invention.

FIG. 8 is a flow chart that describes a method of providing help information of a first user device according to an embodiment of the present invention.

Referring to FIG. 8, the controller 660 identifies information about a function from a video and metadata in step S801. More specifically, the controller 660 receives videos and metadata from the content server 101, meta-information creating server 103, the Internet 105 and broadcasting network 107, via the RF communication unit 610. The controller 660 plays back the received video, analyzes the meta-information related to the video being played back, and identifies information about a function of a user device displayed via a video being played back. For example, the controller 660 plays an advertisement video back, and output a function of a user device shown on the video, e.g., a file transfer function by NFC. The controller 660 checks metadata, i.e., significant time frames included in the metadata, and identifies information about a file transfer function by NFC, being advertised on the video. A significant time frame refers to a time interval to check function information of a user device within a period of time during which video for the function of the user device is played back. The information about a function may further include information about updated functions and information about functions of a user device compatible with the user device. For example, if update information about applications or firmware is shown in an advertisement video, the controller 660 identifies functions to which the updated applications or firmware are applied. When a function compatible with a first user device 100, e.g., another user device function, is advertised in a video and the advertised user device function is compatible with the first user device 100, the controller 660 identifies (e.g. detects) that the function is compatible.

The controller 660 determines whether it supports a function in step S803. The controller 660 identifies information about a function of a user device displayed via a video being played back and determines whether it supports the function by searching a default program table or application table stored in the storage 650 for the function.

The controller 660 activates a help function for the function in step S805. For example, the controller 660 automatically executes a help function application for a function. In an embodiment of the present invention, the controller 660 activates a help function for a function according to one of the following conditions: where the first user device 100 is turned from off to on or executes a function; another function is executed that can create the same result as the function; and a manner in which the function help is executed, part of which is identical to the manner for executing the function.

The controller 660 outputs help information about a function in step S807. For example, the controller 660 outputs a help icon for a function or help information in the form of text or an image.

Figure 9:
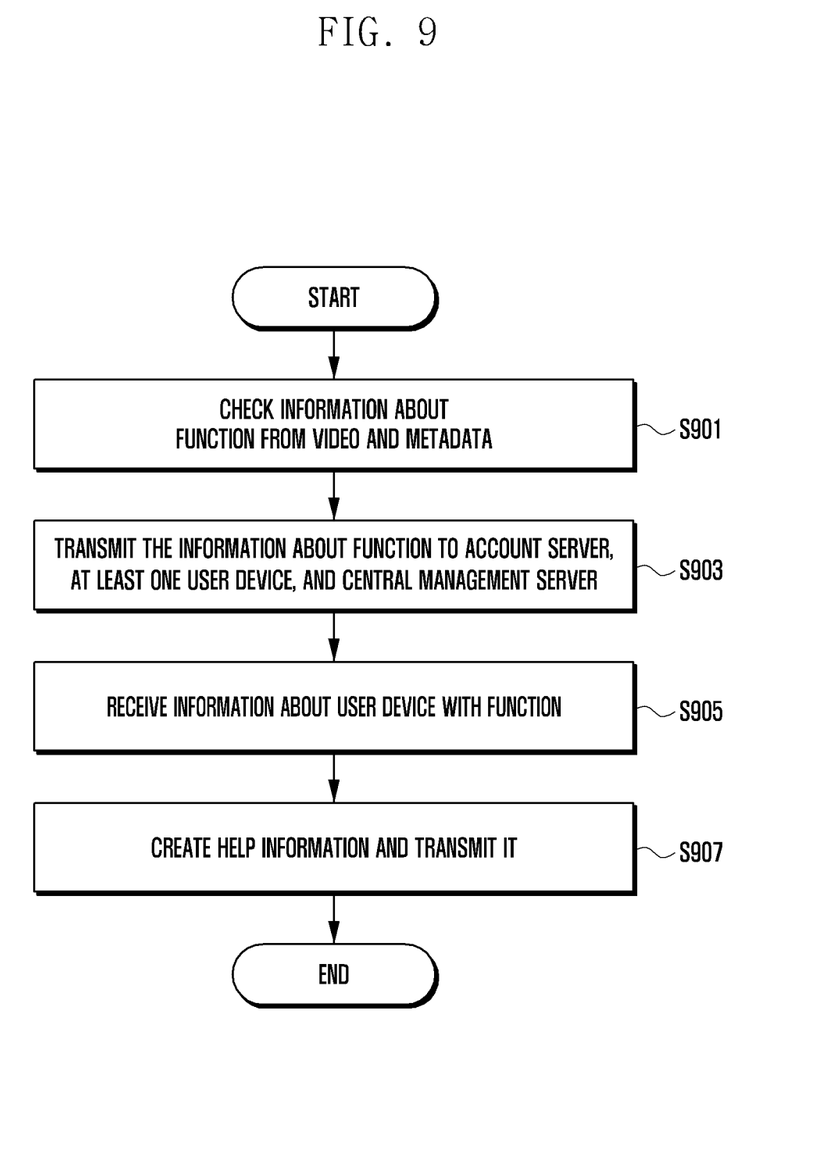
FIG. 9 is a flow chart of a method of providing help information of a second user device according to an embodiment of the present invention.

FIG. 9 is a flow chart of a method of providing help information of a second user device according to an embodiment of the present invention.

Referring to FIG. 9, the controller 760 identifies information about a function from a video and metadata in step S901. More specifically, the controller 760 receives videos and metadata from the content server 101, meta-information creating server 103, the Internet 105 and broadcasting network 107, via the RF communication unit 710. The controller 760 plays back the received video, checks the meta-information related to the video being played back, e.g., significant time frames, and identifies information about a function of a user device displayed via a video being played back.

The controller 760 transmits information about a function to the account server 120, at least one user device, and the central management server 130 in step S903. More specifically, the controller 760 transmits information about a function and information about the second user device 110 to the account server 120. For example, the controller 760 transmits information about a function of a user device, and unique device ID of or user information about the second user device 110 to the account server 120. The account server 120 may refer to a server where information about users and information about a number of user devices are registered, where the users have a number of user devices including the first user device 100 and the second user device 110. In an embodiment of the present invention, the controller 760 establishes a communication channel with at least one user device and transmits information about a function to the at least one user device. In an embodiment of the present invention, the controller 760 transmits information about a function and information about services that the central management server 130 supports to the central management server 130. For example, if a service that the central management server 130 supports is a location-based service, the controller 760 transmits information about a function and location information about a second user device 110 to the central management server 130.

The controller 760 receives information about at least one user device that supports a function in step S905. More specifically, when the controller 760 ascertains that the account server 120 has searched user devices, registered in the account server 120, and identified a user device supporting a function, it receives information about the user device. The controller 760 establishes a communication channel with at least one user device and receives information about a function from the at least one user device via the communication channel. The controller 760 also receives information about a user device supporting a function, located around the second user device 110, from the central management server 130 that provides a location-based service.

The controller 760 creates help information about a function and transmits it to user devices that support the function in step S907. The help information may be information for activating a help function for a function in a user device that supports the function.

Although an embodiment of the present invention is described in such a way that the controller 760 receives information about a user device supporting a function, searched and identified in the account server 120 and the central management server 130, and transmits the created help information to the user device in steps S905 and S907, it should be understood that the present invention is not limited to the embodiment. For example, an embodiment of the present invention may be modified in such a way that the account server 120 and the central management server 130 create help information for activating a help function for a function and transmit it to the user devices that support the function. In steps S903 to S907, the controller 760 may transmit information about a function and help information to at least one user device via communication channels established therebetween. That is, when the controller 760 transmits information about a function and help information to at least one user device, the user device may determine whether it supports the function based on the received information about the function and help information. When the user device supports the function, it can activate the help function for the function.

As described above, the method of providing help information and a user device adapted to the method according to embodiments of the present invention can automatically output, when video for a function of user device is played back, the help information about the function on a video being played back, thereby providing user convenience.

Although certain embodiments of the invention are described in detail above, it should be understood that many variations and modifications of the basic inventive concept herein described, which may be apparent to those skilled in the art, will still fall within the spirit and scope of the present invention as defined by the appended claims and their equivalents.

What is claimed is:

1. A method of providing help information of a user device comprising:
   identifying, by a controller of the user device, information about a function from a video displaying the function and meta-information related to the video, wherein the information about the function comprises information about an updated function;
   determining, by the controller of the user device, whether the user device supports the function based on the identified information;
   activating, by the controller of the user device, when the user device supports the function, a help function for the function; and
   outputting, by the controller of the user device, help information about the function.

2. The method of claim 1, wherein the information about the function further comprises:
   information about compatibility of the function with the user device.

3. The method of claim 1, wherein the meta-information comprises:
   significant time frames of a period of time playing back the video, during which information about the function is output.

4. The method of claim 1, wherein activating the help function comprises one of:
   turning the user device on; or
   executing the function.

5. The method of claim 1, wherein activating the help function comprises one of:

executing another function that creates a result that is the same as the function; or executing the another function in a manner, part of which is identical to a manner for executing the function.

6. The method of claim 1, wherein outputting help information comprises one of:

outputting a help icon for the function; or outputting help information in the form of text or an image.

7. A method of providing help information of a user device comprising:

identifying, by a controller of the user device, information about a function from a video displaying the function and meta-information related to the video;

transmitting, by a radio frequency communication unit, the identified information about the function to at least one of an account server for managing an account of the user device, at least one other user device that establishes a communication channel with the user device, and a central management server where the user device is registered;

receiving information about other user devices supporting the function from at least one of the account server, at least one user device, and the central management server; and creating help information for activating a help function and transmitting the help information to the other user devices supporting the function.

8. The method of claim 7, wherein the account server comprises:

a server configured to manage the user device and the other user devices.

9. The method of claim 7, wherein the communication channel is established via a short range communication module.

10. The method of claim 7, wherein the central management server comprises a server configured to provide a location-based service.

11. A user device for providing help information, comprising:

a touch screen; and a controller configured to identify information about a function from a video displaying the function and meta-information related to the video; determine whether the user device supports the function based on the identified information; activate, when the user device supports the function, a help function for the function; and control the touch screen to output help information about the function, wherein the information about the function comprises information about an updated function.

12. The user device of claim 11, wherein the information about a function further comprises:

information about compatibility of the function with the user device.

13. The user device of claim 11, wherein the meta-information comprises significant time frames of a period of time playing back the video, during which information about the function is output.

14. The user device of claim 11, wherein the controller is further configured to turn the user device on or execute the function to activate the help function for the function.

15. The user device of claim 11, wherein the controller is further configured to execute a function that creates a result that is the same as the function or execute another function in a manner, part of which is identical to the manner for executing the function to activate the help function for the function.

16. The user device of claim 11, wherein the controller is further configured to control the touch screen to output a help icon for the function or help information in the form of text or an image.

17. A user device for providing help information, comprising:

a Radio Frequency (RF) communication unit configured to transmit information about a function to at least one of an account server configured to manage an account of the user device, at least one user device having an established communication channel with the user device, a central management server where the user device is registered; and receive information about other user devices supporting the function from at least one of the account server, at least one user device, and the central management server; and a controller configured to identify information about a function from a video displaying the function and meta-information related to the video; and create help information for activating a help function and transmitting the help information to the other user devices supporting the function.

18. The user device of claim 17, wherein the account server comprises a server configured to manage the user device and the other user devices.

19. The user device of claim 17, further comprising a short range communication module configured to establish the communication channel.

20. The user device of claim 17, wherein the central management server comprises a server configured to provide a location-based service.

* * * * *